(12) United States Patent
Le Gall et al.

(10) Patent No.: US 9,073,644 B2
(45) Date of Patent: Jul. 7, 2015

(54) METHOD AND DEVICE FOR AUTOMATICALLY DETERMINING AN OPTIMIZED APPROACH PROFILE FOR AN AIRCRAFT

(71) Applicant: AIRBUS OPERATIONS (S.A.S.), Toulouse (FR)

(72) Inventors: Virginie Le Gall, Tournefeuille (FR); Alexandre Buisson, Toulouse (FR); Pierre-Xavier Catinat, Toulouse (FR); Valentin Vincent, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/279,956

(22) Filed: May 16, 2014

(65) Prior Publication Data

US 2014/0343766 A1 Nov. 20, 2014

(30) Foreign Application Priority Data

May 17, 2013 (FR) .................................... 13 54469

(51) Int. Cl.
*G05D 1/06* (2006.01)
*B64D 45/04* (2006.01)
(52) U.S. Cl.
CPC ........ *B64D 45/04* (2013.01); *G05D 1/06* (2013.01); *G05D 1/0676* (2013.01)
(58) Field of Classification Search
CPC ..... G05D 1/00; G05D 1/0202; G05D 1/0653; G05D 1/0646; G05D 1/0661; G05D 1/0676; G01C 23/00

USPC ......................................................... 701/2–18
See application file for complete search history.

(56) References Cited

U.S. PATENT DOCUMENTS

| | | | | | |
|---|---|---|---|---|---|
| 3,081,969 | A | * | 3/1963 | Farris et al. .................... | 244/187 |
| 3,169,730 | A | * | 2/1965 | Gaylor et al. .................. | 244/187 |
| 3,265,333 | A | * | 8/1966 | Montooth ...................... | 244/187 |
| 3,666,929 | A | * | 5/1972 | Menn .............................. | 701/16 |
| 3,911,436 | A | * | 10/1975 | Schanzer et al. .............. | 342/411 |
| 4,012,626 | A | * | 3/1977 | Miller et al. ................... | 701/492 |
| 4,357,661 | A | * | 11/1982 | Lambregts et al. ............. | 701/18 |
| 4,709,336 | A | * | 11/1987 | Zweifel ............................ | 701/5 |
| 4,825,374 | A | * | 4/1989 | King et al. ........................ | 701/5 |
| 4,956,780 | A | * | 9/1990 | Sankrithi et al. ................ | 701/16 |

(Continued)

FOREIGN PATENT DOCUMENTS

FR 2 881 234 A1 7/2006

OTHER PUBLICATIONS

French Search Report for Application No. 1354469 dated Feb. 10, 2014.

*Primary Examiner* — Thomas Tarcza
*Assistant Examiner* — Tyler J Lee
(74) *Attorney, Agent, or Firm* — Jenkins, Wilson, Taylor & Hunt, P.A.

(57) ABSTRACT

Method and device for automatically determining an optimized approach profile for an aircraft. The device provides for a flexible configuration change speed which is not limited to the standard single predetermined configuration change speed in order to prevent segments which are not authorized, in particular segments which are too steep, the following configuration (Ci+1) being able to be maintained during a configuration change in an upstream direction until the corresponding speed profile reaches a maximum speed.

11 Claims, 3 Drawing Sheets

(56) References Cited

U.S. PATENT DOCUMENTS

| | | | |
|---|---|---|---|
| 5,398,186 A * | 3/1995 | Nakhla | 701/16 |
| 7,084,785 B2 * | 8/2006 | Rouquette et al. | 340/972 |
| 7,611,098 B2 * | 11/2009 | Van Boven | 244/183 |
| 7,647,140 B2 * | 1/2010 | Demortier et al. | 701/16 |
| 8,027,758 B2 * | 9/2011 | Ferro et al. | 701/18 |
| 8,112,188 B2 * | 2/2012 | Rouquette et al. | 701/16 |
| 8,180,506 B2 * | 5/2012 | Sacle et al. | 701/16 |
| 8,356,776 B2 * | 1/2013 | Berens et al. | 244/183 |
| 8,615,337 B1 * | 12/2013 | McCusker et al. | 701/14 |
| 2010/0200704 A1 * | 8/2010 | Berens et al. | 244/76 A |
| 2013/0238174 A1 * | 9/2013 | Dewas et al. | 701/16 |

* cited by examiner

METHOD AND DEVICE FOR AUTOMATICALLY DETERMINING AN OPTIMIZED APPROACH PROFILE FOR AN AIRCRAFT

TECHNICAL FIELD

The subject matter disclosed herein relates to a method and a device for automatically determining an optimized approach profile for an aircraft.

BACKGROUND

It is known that, in order to construct a descent and/or approach profile for an aircraft, in particular a transport airplane, a flight management system (FMS) of the aircraft defines an optimized vertical profile by performing a calculation in an upstream direction, that is to say a backward calculation. This backward calculation is carried out on the basis of the threshold of the runway or, in accordance with the type of approach, from a conventional point (such as a "missed approach point" or a "final end point") up to the final cruise flight level (identified by a point TD ("top of descent")), taking into account speed and/or altitude constraints inserted into the flight plan. A deceleration point DECEL is likewise calculated by the FMS system. The point DECEL corresponds to the beginning of the deceleration to the approach speed (VAPP). This point DECEL determines the limit between the descent and approach phases.

With this method of backward calculation, the first step is the calculation of the approach profile defined by:
  a final approach profile calculated from the threshold of the runway up to a point FAF ("final approach fix") or FAP ("final approach point"). This final approach profile is determined in the conventional way by a fixed slope angle, corresponding to the final part defined in the procedure; and
  an intermediate approach profile from the point FAF/FAP to the deceleration point DECEL. Along this intermediate profile, the aircraft begins the deceleration from the point DECEL until the final approach speed (VAPP) generally reached at a height of 1000 feet above the ground.

In order to calculate the approach profile, the FMS system considers that the deceleration point DECEL is reached in a clean configuration at the maximum speed (generally at 250 knots) or at a lower speed if constraints exist before the point DECEL. Then:
  aerodynamic configuration change sequences are implemented with in particular a deployment of the slats and flaps,
  the landing configuration is applied and the speed VAPP is reached at 1000 feet above the ground.

In addition, the FMS system conventionally associates a type with each segment defined in the vertical profile. In accordance with the performance levels of the aircraft and the state of the aircraft and external conditions (mass, centre of gravity, altitude, speed, wind and temperature conditions, etc.), and the slope of the segment in question, the aircraft exhibits a specific deceleration capacity along a geometric segment. The deceleration capacity defines the type of geometric segment:
  if the slope of the segment enables a deceleration which is sufficient for the segment to be able to be flown in a clean configuration (that is to say, without the slats and flaps deployed), said segment is said to be in the "clean airbrake" configuration;
  if the slope of the segment does not allow a deceleration which is sufficient for the segment to be able to be flown in a clean airbrake configuration, but on the other hand allows it to be flown with the airbrakes half deployed ("half airbrake"), said segment is said to be in the "half airbrake configuration"; and
  if the slope of the segment does not allow a deceleration which is sufficient for the segment to be able to be flown in the clean airbrake configuration, even with the airbrakes half deployed, said segment is said to be "too steep".

The type of the segment is evaluated at each altitude constraint, and at the changes of aerodynamic configurations, in particular at the transition from the clean airbrake configuration to the configuration 1 and at the transition from the configuration 1 to the configuration 2 (for a given slope, a segment may be in the clean airbrake configuration in configuration 2 and in the half airbrake configuration in configuration 1).

A segment which is too steep brings about vertical discontinuity. In this instance, the FMS system indicates that, taking into account the performance of the aircraft, the segment cannot be flown, even with the airbrakes half deployed, and it allows the pilot the choice of carrying out the appropriate action to overcome this problem (further deploying the airbrakes, anticipating the change of configuration or the deployment of the landing gear). However, from an operational point of view, a vertical discontinuity would have to be avoided to the greatest possible extent, primarily in the approach phase.

In order to overcome this problem, when a segment which is too steep is generated owing to the position of the configuration change point during the calculation of the backward approach profile, the FMS system conventionally makes provision for the current configuration and the current speed to be maintained (in a backward direction) as far as the end of the segment. Consequently:
  a constant speed segment is created;
  a segment which is too steep is prevented; and
  the point DECEL is positioned higher and further from the destination, compared with the profile without anticipated (or "different") modification of configuration in the backward calculation.

An anticipated change of aerodynamic configuration creates better capacities for deceleration along the segment. This change anticipates the appearance of a segment which is too steep, but increases the altitude of the configuration change and thus the altitude of the point DECEL.

With the above logic used by the FMS system to calculate the approach profile, when the configuration change speed (VCC) from the current configuration to the following configuration is reached, the configuration change point is positioned in the profile and the type of the segment is defined. If, in accordance with the position of the configuration change point and altitude constraint(s), a segment which is too steep is provided, an anticipated configuration change logic is applied. The following (or downstream) configuration is maintained (in the backward calculation) and a constant speed is maintained.

A constant speed segment of this type (which is potentially very long) is the major cause of the positioning of the point DECEL at a high altitude.

This is because the position of the point DECEL (that is to say, the point of the beginning of deceleration to the approach speed) must be able to comply with operational considerations. The approach phase must begin at an altitude at which the aircraft is supposed to begin the deceleration to the approach speed. A point DECEL which is too high is not adapted either to the manner in which the pilots are accustomed to carrying out the descent and the approach, or to the speeds anticipated by air traffic control at such an altitude or distance from the final destination.

SUMMARY

An object of the subject matter disclosed herein is to overcome this disadvantage. It relates to a method for automatically determining an optimized approach profile for an aircraft, which method allows the point DECEL to be positioned lower.

To this end, according to the subject matter disclosed herein, the method according to which the approach profile comprises a sequence of segments and aerodynamic configuration change positions and is calculated backwards from a calculation start point, the method comprising at least one step which involves evaluating the type of a segment. It further comprises a sequence of steps intended at least to define on the approach profile aerodynamic configuration change positions and which comprises steps which involve, for each configuration change:

A/ during the backward calculation of the approach profile, with a continuous modification of the speed, if a predetermined speed (of the VCC type, for example) referred to as a configuration change from an upstream configuration to a following downstream configuration is reached, evaluating the type of the segment upstream of the position referred to as the first position, and:

B1/ if the slope of the segment upstream of the first position is of an authorized type, positioning the configuration change at this first position corresponding to the configuration change speed; and B2/ if the segment upstream of the first position is of a prohibited type, maintaining the following backward configuration at the most until the corresponding speed profile reaches a maximum speed (Vlim), the maximum speed being equal to a maximum configuration change speed (of the VFE type, for example) minus a predetermined margin ($\Delta$); and B2a/ evaluating the type of the segment upstream of the position referred to as the second position, and:

if the segment upstream of the second position is of an authorized type, positioning the configuration change at this second position corresponding to the maximum speed; and if the segment upstream of the second position is (still) of a prohibited type, applying a logic for maintaining the current speed and adding a (conventional) segment at constant speed from the second position as far as the position upstream of the upstream segment referred to as the third position, and positioning the configuration change at this third position.

In this manner, there is provided a configuration change speed which is flexible (and which is no longer limited to the single predetermined standard "configuration change" speed of the VCC type) in order to prevent segments which are referred to as being prohibited (or non-authorized), in particular segments which are too steep, by providing continuous acceleration during the backward calculation of the approach profile, instead of applying a conventional logic for anticipated configuration change introducing a segment at constant speed.

In this manner, the relatively high deceleration capacity which may be obtained in a given configuration between the standard configuration change speed (VCC) and the maximum speed is taken into account. In the same manner as for the conventional logic, the current configuration is maintained so that a segment which is too steep is prevented. However, in contrast to this conventional logic, the point DECEL is not moved towards high altitudes and long distances from the destination. The increased drag generated by the anticipated extension of the configuration allows the deceleration to the approach speed to be begun later than with the conventional solution.

Consequently, since the approach profile obtained in this manner allows better deceleration capacities, the deceleration point DECEL (where the deceleration to the approach speed begins) is positioned closer to the destination and lower in terms of altitude. This allows the above-mentioned disadvantage to be overcome.

In the context of the subject matter disclosed herein, a segment is considered to be of a prohibited type (that is to say, non-authorized) if it is evaluated, in a conventional manner, as being a segment which is said to be too steep and/or a segment which is said to be a half airbrake segment in accordance with the implementation method envisaged.

In a first simplified embodiment, at step B2/, the following configuration is simply maintained in a backward direction until the corresponding speed profile reaches the maximum speed Vlim (Vlim=VFE−$\Delta$).

Furthermore, In a second embodiment, the step B2/ comprises sub-steps which involve carrying out, in an iterative manner, the sequence of following operations:

maintaining the following configuration backwards until the corresponding speed profile reaches an auxiliary maximum speed, the auxiliary maximum speed being equal to the sum of the configuration change speed (of the VCC type, for example) and an additional speed which is equal to the product N·V0, N being an integer which is 1 at the first iteration and which is increased by 1 with each new iteration and V0 being a speed range;

evaluating the type of the segment upstream of the position referred to as the auxiliary position, corresponding to the auxiliary maximum speed which is representative of the current iteration, and:

if the segment upstream of the auxiliary position is of an authorized type, positioning the configuration change at this auxiliary position; and if the segment upstream of the auxiliary position is still of a prohibited type, beginning the iteration again, the iterations being repeated at most until the auxiliary maximum speed, which is increased by the speed range V0 at each iteration, reaches the maximum speed (VFE−$\Delta$).

Preferably, the speed range V0 is equal to the quotient of the difference between the maximum speed and the configuration change speed (VCC), by a predetermined an integer.

The subject matter disclosed herein also relates to a device for automatically determining an optimized approach profile for an aircraft, the approach profile comprising a sequence of segments and aerodynamic configuration change positions.

According to the subject matter disclosed herein, the device of the type configured to calculate the approach profile backwards from a calculation start point and configured to and comprising at least means for evaluating the type of a segment, it further comprises a calculation unit which is intended at least to define on the approach profile aerodynamic configuration change positions and which is configured to and comprises at least the following means used during each configuration change:

configured to and first means for positioning the configuration change at a first position corresponding to a predetermined speed referred to as a configuration change from an upstream configuration to a following downstream configuration if the segment upstream of the first position is of an authorized type;

configured to and second means for maintaining the following backward configuration at the most until the corresponding speed profile reaches a maximum speed, if the segment upstream of the first position is of a prohibited type (that is to say, non-authorized), the maximum speed being equal to a maximum configuration change speed minus a predetermined margin;

configured to and third means for positioning the configuration change at a second position corresponding to the maximum speed if the segment upstream of the second position is of an authorized type; and configured to and fourth means for applying a logic for maintaining the current speed and adding a segment at a constant speed from the second position as far as the upstream position of the upstream segment referred to as the third position, and positioning the configuration change at the third position if the segment upstream of the second position is (still) of a prohibited type.

In a specific embodiment, the second means comprise:

configured to and means for maintaining the following configuration backwards until the corresponding speed profile reaches an auxiliary maximum speed, the auxiliary maximum speed being equal to the sum of the configuration change speed and an additional speed which is equal to the product N·V0, N being an integer which is 1 at the first iteration and which is increased by 1 at each new iteration and V0 being a speed range;

configured to and means for positioning the configuration change at an auxiliary position corresponding to the auxiliary maximum speed which is representative of the current iteration if the segment upstream of the auxiliary position is of an authorized type; and configured to and means for restarting the iteration if the segment upstream of the auxiliary position is still of a prohibited type, the iterations being repeated at the most until the auxiliary maximum speed which is increased from the speed range V0 at each iteration reaches the maximum speed.

The subject matter disclosed herein also relates to a flight management system of an aircraft, which system comprises a device for automatically determining an optimized approach profile as set out above.

The subject matter disclosed herein further relates to an aircraft, in particular a transport airplane, which is provided with such a device and/or such a system.

BRIEF DESCRIPTION OF THE DRAWINGS

The figures of the accompanying drawings will enable a good understanding of how the subject matter disclosed herein can be carried out. In these figures, identical reference numerals denote like elements.

DETAILED DESCRIPTION

Figure 1:
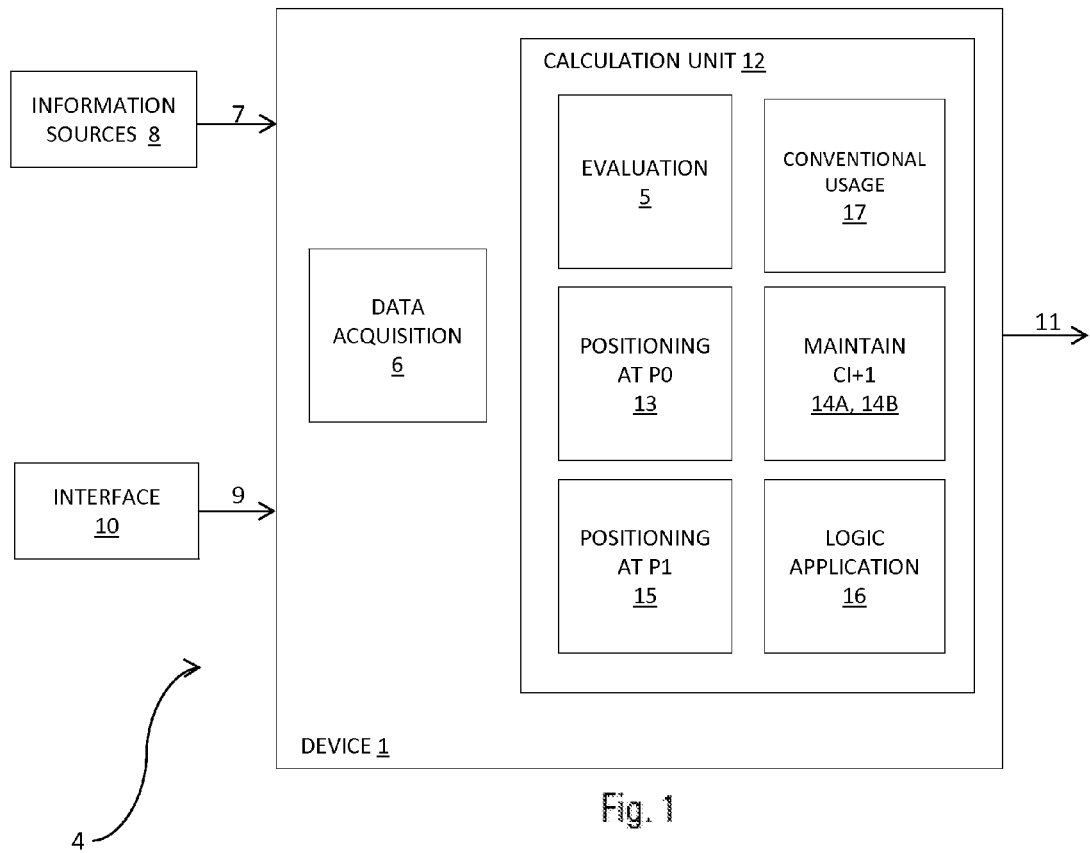
FIG. 1 is a block diagram of a device which illustrates an embodiment of the subject matter disclosed herein.

The device 1 which is schematically illustrated in FIG. 1 and which allows the subject matter disclosed herein to be illustrated is intended to automatically determine an optimized approach profile PA for an aircraft AC, in particular a transport airplane.

In a preferred embodiment, the device 1 is part of a flight management system (FMS) 4 of the aircraft AC.

Figure 2:
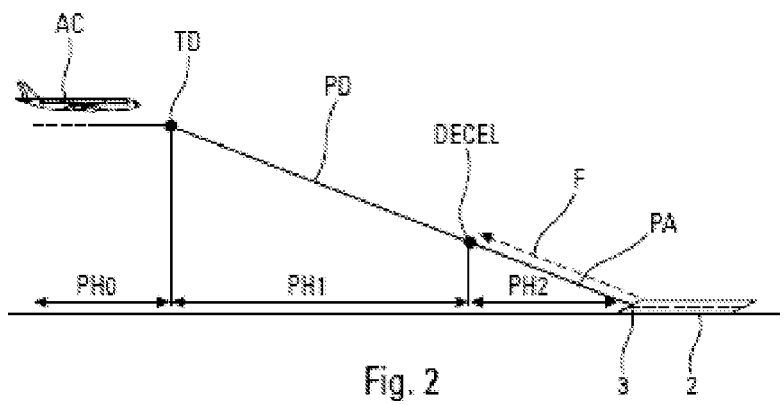
FIG. 2 shows a flight profile, from a cruising altitude to landing.

As illustrated schematically in FIG. 2, during a flight of the aircraft AC, in order to land on a landing runway 2, from a cruising phase PH0, the aircraft AC begins a descent phase PH1 between a point TD and a point DECEL, in accordance with a descent profile PD, followed by an approach phase PH2 between this point DECEL and a threshold 3 of the runway 2, in accordance with an approach profile PA.

Figure 3:
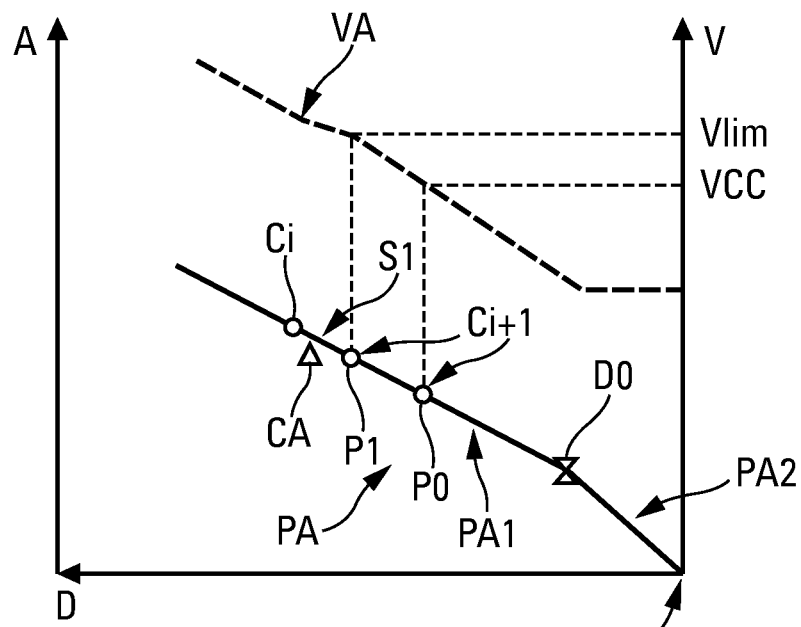
FIG. 3 is a diagram which allows the subject matter disclosed herein to be explained.
Figure 4:
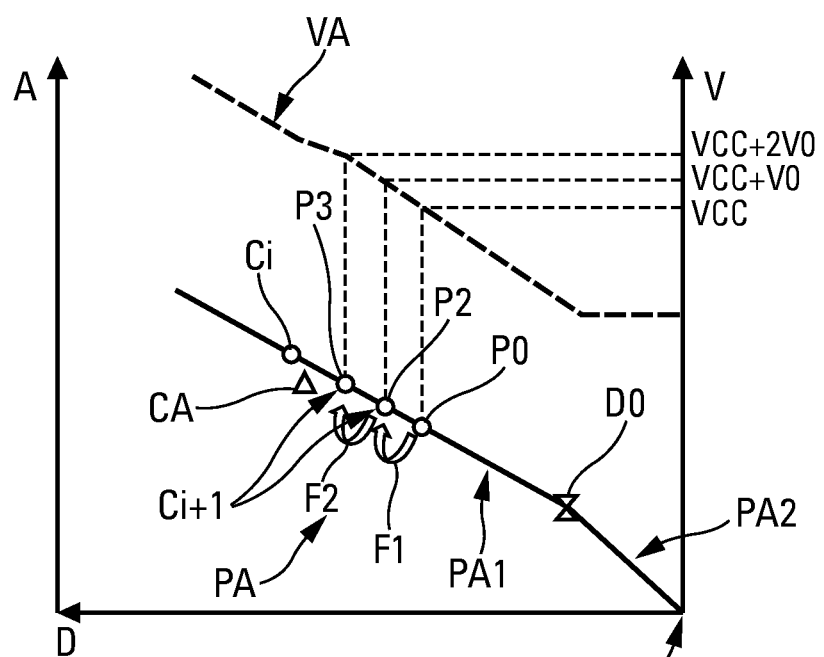
FIG. 4 is a diagram which allows a specific embodiment of the subject matter disclosed herein to be explained.

Conventionally, this approach profile PA comprises, as illustrated in FIGS. 3 and 4:

an intermediate approach profile PA1 from the deceleration point DECEL to a point D0 (for example, a point FAF ("final approach fix") or a point FAP ("final approach point"). Along this intermediate profile PA1, the aircraft AC begins the deceleration from the point DECEL (at the maximum speed, generally 250 knots, or the lowest speed constraint which can be flown in the clean airbrake configuration) until the final approach speed (VAPP) which is generally reached at a height of 1000 feet above the ground. This intermediate approach profile PA1 comprises a series of segments and aerodynamic configuration change positions, as illustrated in FIGS. 3 and 4 and set out below; and a final approach profile PA2 from the point D0 (FAF or FAP) as far as the threshold 3 of the runway 2 (or to a conventional point such as a "missed approach point" or a "final end point"). This final approach profile PA2 conventionally has a fixed slope angle corresponding to the final part defined in the procedure.

The device 1 which is installed onboard the aircraft AC comprises in particular, as illustrated in FIG. 1, means 5 for evaluating the type of a segment of the profile PA, which may be:

a segment referred to as a "clean airbrake" segment;
a segment referred to as a "half airbrake" segment; or
a segment referred to as "too steep".

The device 1 also comprises data acquisition means 6, and in particular:

data which are received via a connection 7 of an assembly 8 of information sources which measure and/or determine current values relating to the aircraft AC (speed, altitude, etc.) and external conditions (wind, temperature, etc.) and provide them via the connection 7; and data received via a connection 9 of a man/machine interface 10, which allows the crew to enter data and in particular the flight plan into the device 1.

The means 8 and 10 may also be part of the device 1, which transmits in particular the calculated profile PA, via a connection 11, to conventional user means or systems, for example, processors or display devices (not shown), some of which may be part of the device 1 and/or the system 4.

The device 1 is configured to calculate, in the conventional way, the approach profile PA backwards from the threshold of the runway or a conventional point (such as a "missed approach point" or a "final end point"), as illustrated by an arrow F in FIG. 2.

According to the subject matter disclosed herein, in particular for performing the calculation of an approach profile PA which optimises the position of the point DECEL for beginning the deceleration to the approach speed, and the sequence of modifications of the aerodynamic configuration (deflection of the slats and flaps in particular), the device 1 further comprises a calculation unit 12 which is intended at least to define on the approach profile PA positions for changing the aerodynamic configuration. This calculation unit 12 is configured to and comprises at least the following means which are used in particular during each configuration change between an upstream configuration Ci (for example, a clean airbrake configuration 1, 2, etc.) and a configuration which is directly downstream Ci+1 (for example, a configuration of type 1, 2, etc.):

- configured to and means 13 for positioning the configuration change at a first position P0 which corresponds to a conventional predetermined speed VCC referred to as a configuration change from an upstream configuration Ci to a following downstream configuration Ci+1 if the segment upstream of the first position P0 is of an authorized type (the segment being evaluated by the means 5 which are, for example, part of the unit 12);
- configured to and means 14A, 14B for maintaining the following backward configuration CI+1 at the most until the corresponding speed profile VA reaches a maximum speed Vlim if the segment upstream of the first position P0 is of a prohibited type. The maximum speed Vlim is equal to a maximum configuration change speed of the type VFE minus a predetermined margin $\Delta$;
- configured to and means 15 for positioning the configuration change at a second position P1 which corresponds to the maximum speed Vlim if the segment S1 upstream of the second position P1 is of an authorized type (as shown in the example of FIG. 3); and
- configured to and means 16 for applying a logic for maintaining the current speed (as implemented by conventional means 17) and adding a conventional segment at constant speed from the second position P1 as far as the upstream position of the upstream segment referred to as the third position and positioning the configuration change at the third position P1 if the segment upstream of the second position P1 is of a prohibited type.

In the context of the subject matter disclosed herein, a segment is considered to be of a prohibited type (that is to say, non-authorized) if it is evaluated in a conventional manner (using the means 5) as being a segment which is said to be "too steep" and/or a segment which is referred to as a "half brake" segment, in accordance with the implementation method envisaged.

Conventionally, the speeds VCC and VFE are known and are either stored in the unit 12 or received from the means 8. More specifically:

- VCC is the standard configuration change speed (between two specific given configurations Ci and Ci+1). VCC is therefore dependent on the configuration change envisaged (for example, from a clean airbrake configuration to a type 1 configuration);
- VFE is the maximum configuration change speed (between two specific given configurations Ci and Ci+1). It corresponds to a structural limitation of the aircraft AC and is therefore also dependent on the configuration change envisaged; and
- Vlim=VFE−$\Delta$, $\Delta$ being a predetermined speed margin, for example, of approximately a few knots, so as not to reach the maximum speed VFE.

FIGS. 3 and 4 show two graphs which comprise:
- an altitude scale A;
- a distance scale D relative to the destination; and
- a speed scale V, with a profile or curve VA illustrating the speed of the aircraft AC as a function of the altitude A and the distance D.

This speed scale V shows:
- the speed Vlim (FIG. 3); and
- the speed VCC.

Altitude constraints CA have also been shown in FIGS. 3 and 4.

In a simplified basic embodiment (comprising the means 14A), the following configuration Ci+1 is simply maintained in a backward direction until the corresponding speed profile VA reaches the maximum speed Vlim (FIG. 3).

The calculation unit 12 therefore produces, in an iterative manner, the following sequence of operations:

A/ during the backward calculation of the approach profile PA, with a continuous modification of the speed, if a speed VCC for changing configuration from an upstream configuration Ci to a following downstream configuration Ci+1 is reached, evaluating the type of the segment upstream of the corresponding position P0, and:

B1/ if the slope of the segment upstream of the position P0 is of an authorized type, positioning the configuration change (from Ci to Ci+1) at this position P0 corresponding to the configuration change speed VCC; and B2/ if the segment upstream of the position P0 is of a prohibited type, maintaining the following backward configuration at the most until the speed profile PV reaches the maximum speed Vlim; and B2a/ evaluating the type of the segment upstream of the position P1 (corresponding to Vlim) and:
- if the segment upstream of the position P1 is of an authorized type, positioning the configuration change at this position P1, as shown in FIG. 3; and
- if the segment upstream of the position P1 is of a prohibited type, applying a conventional logic for maintaining the current speed (using the conventional means 17) and adding to the profile VA a conventional segment at constant speed, from the position P1 as far as the position upstream of the upstream segment referred to as the third position, and positioning the configuration change at this third position.

In this manner, the device 1 provides for a configuration change speed which is flexible (and which is no longer limited to the single predetermined standard "configuration change" speed of the VCC type) in order to prevent segments which are referred to as being prohibited (or non-authorized), in particular segments which are too steep, by providing continuous acceleration during the backward calculation of the approach profile, instead of applying a conventional logic for anticipated configuration change introducing a segment at constant speed.

In this manner, the device 1 takes into account the relatively high deceleration capacity which may be obtained in a given configuration between the standard configuration change speed VCC and the maximum speed Vlim. The increased drag generated by the anticipated extension of the configuration (at P1 instead of P0) allows the deceleration to the approach speed to be begun later than with the conventional solution. Consequently, since the approach profile PA obtained in this manner allows better deceleration capacities, the deceleration point DECEL (where the deceleration to the approach speed begins) is positioned closer to the destination and lower in terms of altitude.

Consequently:
for procedures without constraints, the configuration is changed to the minimum speed VCC (position P0) in order to reduce the noise and the drag to the greatest possible extent; and
for procedures with constraints, involving significant slopes (if the configurations were extended late, the deceleration capacity of the aircraft AC would be limited or impossible), the configurations are changed close to the maximum change speed and are therefore changed earlier, which generates an earlier deceleration, that is to say that the configuration change point is moved in an upstream direction (from P0 to P1) when additional deceleration capacity is required.

In the above-mentioned basic embodiment, the configuration change is therefore carried out at the speed Vlim, whereas a less significant speed could have been sufficient to prevent a non-authorized segment, which is in particular too steep. This additional speed generates a noise and a fuel consumption which are not strictly necessary.

Figure 5:
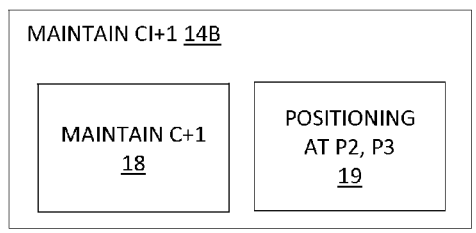
FIG. 5 is a schematic illustration of a specific embodiment of the device.

Therefore, in order to optimise the change in the range between VCC and Vlim, in a specific embodiment, the means 14B comprise, as shown in FIG. 5:
means 18 for maintaining the following configuration Ci+1 backwards from the speed VCC until the corresponding speed profile VA reaches an auxiliary maximum speed VCC+V0, VCC+2V0, etc. This auxiliary maximum speed is equal to the sum of the configuration change speed VCC and an additional speed Vsup which is equal to the product N·V0. In this product, N is an integer which is equal to 1 at the first iteration and which is increased by 1 at each new iteration, and V0 is a speed range;
means 19 for positioning the configuration change at an auxiliary position P2, P3 (as illustrated by arrows F1 and F2 in FIG. 4), corresponding to the auxiliary maximum speed which is representative of the current iteration if the segment upstream of the auxiliary position P2, P3 is of an authorized type.

In contrast, the iteration is repeated if the segment upstream of the auxiliary position is still of a prohibited type.

The iterations are repeated, at the most, until the auxiliary maximum speed which is increased from the speed range V0 at each iteration, reaches the maximum speed Vlim.

Preferably, the speed range V0 is equal to the quotient of the difference between the maximum speed Vlim (Vlim=VFE−Δ) and the configuration change speed VCC by a predetermined whole number L, which is, for example, between 2 and 6. Thus:

$$V0=(Vlim-VCC)/L$$

This last embodiment allows the profile to be optimized in such a manner that the configuration changes are implemented at speeds which limit the generation of non-authorized segments (which are in particular too steep) and position the point DECEL lower and closer to the destination, whilst limiting additional impacts relating to the noise and the fuel consumption.

Figure 6:
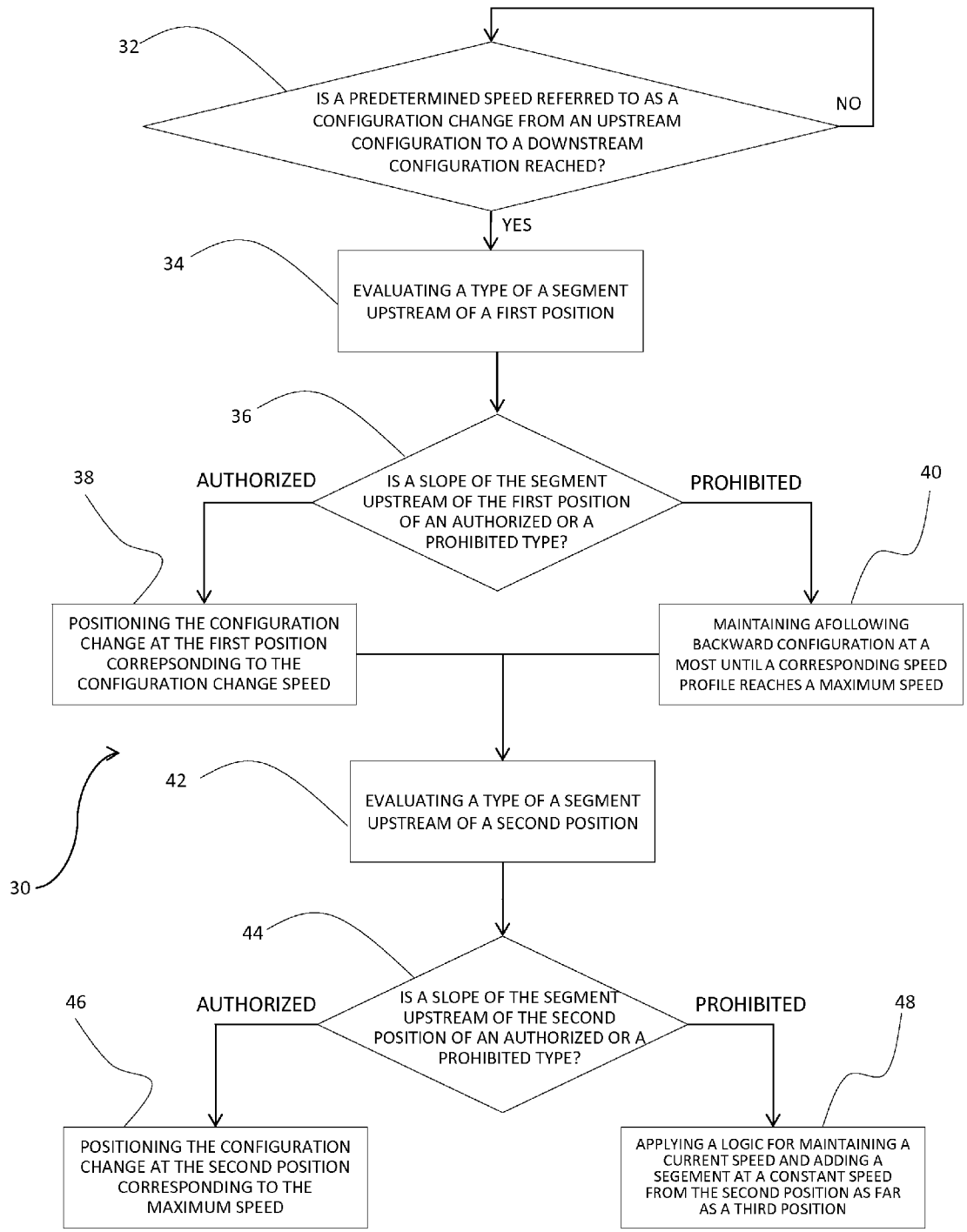
FIG. 6 is a flow diagram of a method for automatically determining an optimized approach profile for an aircraft.

FIG. 6 is a flow diagram of a method (generally designated 30) for automatically determining an optimized approach profile for an aircraft. In some aspects, the method 30 illustrated in FIG. 6 can be implemented at a flight management system.

In step 32, it is determined whether a predetermined speed (e.g., of the VCC type) referred to as a configuration change from an upstream configuration to a downstream configuration is reached. If no, method 30 returns to step 32. Alternatively, if yes, then method 30 continues to step 34.

In step 34, a type of a segment upstream of a position referred to as the first position is evaluated. For example, step 34 can be accomplished during the backward calculation of the approach profile, with a continuous modification of a speed.

In step 36, it is determined whether a slope of the segment upstream of the first position is of an authorized type or a prohibited type. If the slope of the segment upstream of the first position is of an authorized type, then method 30 continues to step 38, whereas if the slope of the segment upstream of the first position is of a prohibited type, then method 30 continues to step 40.

In step 38, the configuration change at the first position corresponding to the configuration change speed is positioned when the slope of the segment upstream of the first position is of an authorized type.

In step 40, the following backward configuration is maintained at the most until the corresponding speed profile reaches a maximum speed (Vlim) when the slope of the segment upstream of the first position is of a prohibited type. For example, the maximum speed can be equal to a maximum configuration change speed (of the VFE type, for example) minus a predetermined margin (Δ).

In step 42, a type of a segment upstream of a position referred to as the second position is evaluated.

In step 44, it is determined whether a slope of the segment upstream of the second position is of an authorized type or a prohibited type. If the slope of the segment upstream of the second position is of an authorized type, then method 30 continues to step 46, whereas if the slope of the segment upstream of the second position is of a prohibited type, then method 30 continues to step 48.

In step 46, the configuration change at the second position corresponding to the maximum speed is positioned when the slope of the segment upstream of the second position is of an authorized type.

In step 48, a logic for maintaining the current speed and adding a (conventional) segment at constant speed from the second position as far as the position upstream of the upstream segment referred to as the third position is applied and the configuration change is positioned at the third position when the slope of the segment upstream of the second position is (still) of a prohibited type.

The invention claimed is:
1. A method for automatically determining an optimized approach profile for an aircraft, the approach profile comprising an intermediate approach profile comprising a sequence of segments and aerodynamic configuration change positions and a final approach profile comprising a fixed slope angle, wherein the approach profile is calculated backwards from a calculation start point, the method comprising:
at a flight management system:
evaluating a type of a segment; and
the method further comprising a sequence of steps to at least define on the aerodynamic configuration change positions of the intermediate approach profile and which steps involve, for each configuration change:
(A) during backward calculation of the intermediate approach profile, with a continuous modification of a speed, if a predetermined speed referred to as a configuration change from an upstream configuration to a following downstream configuration is reached, evaluating a type of a segment upstream of a first position, and:

(B1) if a slope of the segment upstream of the first position is of an authorized type, positioning the configuration change at the first position corresponding to the configuration change speed;

(B2) if the slope of the segment upstream of the first position is of a prohibited type, maintaining a following backward configuration at the most until a corresponding speed profile reaches a maximum speed, the maximum speed being equal to a maximum configuration change speed minus a predetermined margin; and (B2a) evaluating a type of a segment upstream of a second position; and:

if a slope of a segment upstream of the second position is of an authorized type, positioning the configuration change at the second position corresponding to the maximum speed; and if the slope of the segment upstream of the second position is of a prohibited type, applying a logic for maintaining a current speed and adding a segment at a constant speed from the second position as far as a third position upstream of the upstream segment, and positioning the configuration change at the third position.

2. The method according to claim 1, wherein the segment is considered to be of the prohibited type at least if it is a segment which is too steep.

3. The method according to claim 2, wherein the segment is considered to be of the prohibited type at least if it is a segment which is a half airbrake segment.

4. The method according to claim 1, wherein, at step B2, the following configuration is maintained in a backward direction until the corresponding speed profile reaches the maximum speed.

5. The method according to claim 1, wherein the step B2 comprises sub-steps which involve carrying out, in an iterative manner, a sequence of following operations:

maintaining the following configuration backwards until the corresponding speed profile reaches an auxiliary maximum speed, the auxiliary maximum speed being equal to a sum of the configuration change speed and an additional speed which is equal to the product N.V0, N being an integer which is 1 at the first iteration and which is increased by 1 with each new iteration and V0 being a speed range;

evaluating a type of a segment upstream of an auxiliary position corresponding to the auxiliary maximum speed which is representative of a current iteration, and:

if a slope of a segment upstream of the auxiliary position is of an authorized type, positioning the configuration change at the auxiliary position; and if the slope of the segment upstream of the auxiliary position is of a prohibited type, beginning the iteration again, the iterations being repeated at the most until the auxiliary maximum speed, which is increased by the speed range V0 at each iteration, reaches the maximum speed.

6. The method according to claim 5, wherein the speed range V0 is equal to a quotient of a difference between the maximum speed and the configuration change speed, by a predetermined integer.

7. A device for automatically determining an optimized approach profile for an aircraft, the approach profile comprising an intermediate approach profile comprising a sequence of segments and aerodynamic configuration change positions and a final approach profile comprising a fixed slope angle, wherein the device is configured to calculate the approach profile backwards from a calculation start point and for evaluating a type of a segment, the device comprising:

a calculation unit configured to define on the aerodynamic configuration change positions of the intermediate approach profile and which is configured at least for the following used during each configuration change:

positioning the configuration change at a first position corresponding to a predetermined speed referred to as a configuration change from an upstream configuration to a following downstream configuration if a slope of a segment upstream of the first position is of an authorized type;

maintaining a following backward configuration at the most until a corresponding speed profile reaches a maximum speed, if the slope of the segment upstream of the first position is of a prohibited type, the maximum speed being equal to a maximum configuration change speed minus a predetermined margin;

positioning the configuration change at a second position corresponding to the maximum speed if a slope of a segment upstream of the second position is of an authorized type; and applying a logic for maintaining a current speed and adding a segment at a constant speed from the second position as far as a third position upstream of the upstream segment, and positioning the configuration change at the third position if the slope of the segment upstream of the second position is of a prohibited type.

8. The device according to claim 7, wherein for:

maintaining the following backward configuration at the most until the corresponding speed profile reaches the maximum speed, if the slope of the segment upstream of the first position is of the prohibited type, the maximum speed being equal to a maximum configuration change speed minus a predetermined margin, the device is configured:

for maintaining the following configuration backwards until the corresponding speed profile reaches an auxiliary maximum speed, the auxiliary maximum speed being equal to a sum of the configuration change speed and an additional speed which is equal to the product N.V0, N being an integer which is 1 at the first iteration and which is increased by 1 at each new iteration and V0 being a speed range;

for positioning the configuration change at an auxiliary position corresponding to the auxiliary maximum speed which is representative of a current iteration if a slope of a segment upstream of the auxiliary position is of an authorized type; and for restarting the iteration if the slope of the segment upstream of the auxiliary position is of a prohibited type, the iterations being repeated at the most until the auxiliary maximum speed which is increased from the speed range V0 at each iteration reaches the maximum speed.

9. A flight management system of an aircraft, comprising a device according to claim 7.

10. An aircraft, comprising a device according to claim 7.

11. An aircraft, comprising a flight management system according to claim 9.

* * * * *